United States Patent [19]

Ericsson

[11] Patent Number: 4,537,877
[45] Date of Patent: Aug. 27, 1985

[54] PARTICULATE OIL-ABSORBING COMPOSITION TO ABSORB OIL

[75] Inventor: Thomas Ericsson, Molndal, Sweden

[73] Assignee: Papyrus Kopparfors AB, Molndal, Sweden

[21] Appl. No.: 493,393

[22] Filed: May 10, 1983

[30] Foreign Application Priority Data

May 10, 1982 [SE] Sweden ................................ 8202932

[51] Int. Cl.³ ............................................. B01J 20/22
[52] U.S. Cl. ..................... 502/402; 502/404; 210/693; 210/924
[58] Field of Search ............... 502/401, 62, 402, 404; 210/693, 924, 690, 691

[56] References Cited

U.S. PATENT DOCUMENTS

| | | |
|---|---|---|
| 3,770,575 | 11/1973 | Ball ........................................ 162/100 |
| 3,855,152 | 12/1974 | Preus ................................. 502/401 X |
| 4,206,080 | 6/1980 | Sato et al. ......................... 502/401 X |
| 4,343,680 | 8/1982 | Field .................................... 162/100 |

*Primary Examiner*—W. J. Shine

[57] ABSTRACT

A process for absorbing oil and a particulate oil-absorbing composition are provided, which composition in dust form displays a low explosion hazard and a low flammability, but which after absorption of oil is flammable and entirely consumed when burned, the particles comprising as the major component at least 50% by weight hydrophobic cellulose pulp fibers blended with at least 30% up to 50% of an inorganic cellulose paper pulp filler.

10 Claims, No Drawings

PARTICULATE OIL-ABSORBING COMPOSITION TO ABSORB OIL

SPECIFICATION

Particulate oil absorbents are widely used to soak up organic liquids such as oils spilled on water, factory floors, highways, and on the ground, such as along beaches and coastal areas. Sawdust is readily available, and has a good absorption capacity for such liquids, and is the most widely used oil absorbent. However, sawdust has the important disadvantage of forming a finely divided highly inflammable dust, which can in confined spaces such as buildings ignite and cause a dust explosion. Under recently enacted legislation requiring elimination of such hazards in the workpiece, it has become necessary to develope new oil-absorbing compositions which are less likely to present the hazard of dust explosions.

Among the materials proposed for such compositions are inorganic volcanic materials such as volcanic ash, and crushed stone or rock. Such materials have however a very low capacity for absorption of oil, and the oil that is absorbed is not well retained, and tends to bleed out from the composition after it has been gathered up. Moreover, dusts from volcanic ash and crushed stone or rock are highly abrasive, and can cause damage to machinery in the workplace, as well as irritation of the human body, both externally and internally. Moreover, such materials have to be disposed of by dumping, or else the oil leached out and the material reused, which is normally impractical.

The present invention provides a particulate oil-absorbing composition which in dust form displays a low explosion hazard and a low flammability, but which after absorption of oil is flammable and entirely consumed when burned. Thus, the composition can safely be used in the workplace, and at the same time is easily disposed of by burning in for example an incinerator or in a furnace, leaving only a relatively small volume of ash. Moreover, the oil-absorbing composition of the invention has an oil absorption capacity comparable to that of sawdust, and can be based upon waste cellulose pulp fiber materials available at low cost.

The particulate oil absorbing composition according to the invention is composed of particles comprising as the major component at least 50% by weight hydrophobic cellulose pulp fibers blended with at least 30% up to 50% of an inorganic cellulose paper pulp filler.

The invention also provides a process for absorbing organic liquids and particularly oil which comprises contacting the liquid with a particulate oil absorbing composition composed of particles comprising as the major component at least 50% by weight hydrophobic cellulose pulp fibers blended with at least 30% up to 50% of an inorganic cellulose paper pulp filler, absorbing the liquid therein, and then, preferably, burning the composition.

The cellulose pulp fibers can be prepared from lignocellulosic material such as wood by any pulping process, such as a chemical, mechanical, chemimechanical or semichemical process, and mixtures thereof, for example, from sulphate pulp, sulphite pulp and/or polysulphide chemical pulp fibers, as well as groundwood pulp and other types of mechanical pulp fibers. Waste cellulose pulp fiber materials such as reject pulp fibers from pulp mills or paperboard mills and waste paper pulp fibers reconstituted from paper products such as paper and cardboard in paper reprocessing mills are inexpensive, and particularly preferred.

The cellulose pulp fibers are rendered hydrophobic by any conventional hydrophobing treatment. A conventional sizing treatment can be used, using, for example, rosin, starch, casein, soya protein, natural and synthetic resins, including resin monomers and prepolymers, as well as polymers. Thus, for example, the fibers can be rendered hydrophobic by sizing with water-insoluble polyvinyl alcohol, hydroxyethyl cellulose, ethyl cellulose, carboxymethyl cellulose, polyacrylate resin, alkyd resin, polyester resin, polyethylene or polypropylene. A thermoplastic material can be applied by melting, for example, thermoplastic polyacrylate, alkyd or polyester polymer or a polyethylene or polypropylene polymer, on the cellulose pulp fibers. The hydrophobing treatment forms no part of the invention, but entirely conventional in every respect, and is of course applied to the fibers before they are blended with the inorganic cellulose paper pulp filler.

The inorganic cellulose paper pulp filler is preferably one conventionally used in paper and paperboard manufacture. Exemplary are the clays, kaolinite, montmorillonite and bentonite clays being preferred, but any clay can be used; talcum, chalk, calcium carbonate, gypsum, calcium sulphate, barytes, titanium dioxide, silica, magnesium sulphate, and zinc sulfide.

If the cellulose pulp fibers are waste cellulose pulp fibers from pulp or paperboard mills, reconstituted from a paper or cardboard product, they may already contain the filler material, since this may have been present as a filler or coating agent in the manufacture of the paper or cardboard that is being reconstituted.

In addition, other kinds of additives commonly used in paper products, such as retention agents, latex and pigments, can also be present, and, since they are inert, are nondeleterious. Neither do they affect the flammability of the composition after absorption of oil, provided they are present in a minor proportion, and the cellulose pulp fibers in a major proportion.

The oil-absorbing composition in accordance with the invention can have any particulate form, such as: a mixture of fibers and granules; granules prepared by further subdividng fibers and the inorganic material; shreds formed by shredding the mixture of fibers and particulate inorganic filler material; and powders.

A preferred oil-absorbing composition according to the invention comprises about 70% by weight hydrophobic cellulose fibers, prepared from a mixture of mechanical waste fiber and sulphate waste fibers rendered hydrophobic by conventional rosin sizing, and about 30% by weight of inorganic filler material in the form of kaolin clay. In the form of garanules, the material is now being marketed under the tradename ALFOB 80, and in shredded form as ALFOB 800. This material when heated is carbonized, and is resistant to burning in an open flame, so that the composition has a low fire hazard, despite a heat capacity of about 10.5 MJ/kg. However, after absorption of oil, the material burns very well, so that it is easily disposed of by burning, in a waste incinerator or similar apparatus.

Thus, the oil-absorbing composition according to the invention provides a high oil absorbing capacity due to the cellulose fibers, while simultaneously either eliminating or greatly reducing the fire hazard arising from the large proportion of cellulose pulp fibers, due to the nonflammable inorganic cellulose pulp filler material also present.

The inorganic filler material has the additional advantage of weighing down the particles, due to its higher density, as compared to the cellulose pulp fibers. The particulate oil-absorbing composition of the invention can accordingly be directed onto the liquid to be absorbed such as the oil by entering the material in air and then blowing the resulting stream onto the liquid or oil. The material according to the invention is more effective than similar materials comprised of bark or cut shavings. Sawdust cannot be applied by blowing onto the liquid or oil, due to its low density, and high tendency to dust. Nonetheless, despite the presence of a substantial amount of inorganic material, the particles are lighter than water, and float, which makes it possible to use the composition for cleaning oil from water and water-soaked ground such as beaches and shores.

The composition of the invention is used by applying it to the liquid to be absorbed so as to bring it into contact therewith, whereupon the liquid is absorbed. Any application method can be used. In addition to blowing, the particles of composition can be distributed over or sprinkled over the liquid, or dumped onto it. Then, after absorption is complete, the impregnated material is gathered up and burned or otherwise disposed of.

The compositions according to the invention can be prepared by the following procedure. The cellulose pulp fibers are suspended in water together with the inorganic filler material, and any desired additional additives added. The resulting cellulose pulp fiber slurry can then be passed on to a head box, distributing the material onto a Fourdrinier or other papermaking wire for dewatering. The solids content can be increased by passing the laid-down sheet of material through press rollers, and then the dewatered material is fed to a feed screw, which disintegrates the pressed web into pieces, and feeds the pieces to a drum dryer, where the material is dried to a final high solids content above about 90%. The particulate material is then ready for use, and can be filled into bags for distribution, or can be further subdivided by granulating or in a mill, if desired.

A preferred oil-absorption agent according to the invention can be prepared from the waste water from the board machines in a paperboard mill, which contain large amounts of cellulose reject pulp fibers, and kaolin filler. Waste waters from groundwood mills and from pulp refiners also contain cellulose pulp reject fibers. Such fiber-containing waste waters can be blended or used separately and pumped to a setting tank, where the settled material, consisting essentially or reject pulp fibers and filler, is separated from the waste water. The settled material then is pumped to a mixing tank, where any additional chemicals can be added, as desired, and then to a head box, distributing the material onto a twin wire for dewatering. The laid-down material is then passed through press rollers, which increase the solids content to from 35 to 40%. The dewatered material is fed by a feed screw which disintegrates the pressed web into coarse particles to a drum dryer, where the material is dried to a final solids content of about 92%. The material is then filled into bags.

If the oil-absorbing composition of the invention is to be used in cleaning water surfaces such as lakes, shores and beaches, high hydrophobicity is required, so that the material will float on water for a period of from one to three days. The material can be given an increased hydrophobicity by increasing the amount of hydrophobing agent, such as size or resin polymer or prepolymer, as well as retention agent, or by applying a wax dispersion in a separate step.

The following Example in the opinion of the inventor represents a preferred embodiment of the invention.

EXAMPLE 1

An oil-absorbing agent according to the invention was prepared by the procedure described above from a mixture of reject mechanical cellulose pulp fibers and sulphate pulp fibers sized with a conventional rosin size (Hercules T-size), and then blended in an amount of about 70% by weight with about 30% by weight of kaolin. One portion of the material was granulated, and the other portion shredded. The oil absorption capacity of the resulting material was then evaluated and compared to the oil absorbing capacity of two conventional oil absorbing agents, one sawdust, and the other a crushed rock product marketed under the tradename ABSOL. The following test procedure was used.

5 g of the oil-absorbing material to be tested is weighed, and is then transferred to a one liter beaker containing 400 ml of the oil (hydraulic oil or lubricating oil) to be absorbed. The mixture of oil and oil absorbing agent then is stirred for 5 minutes, using a magnetic stirrer at 500 rpm. The mixture is allowed to stand for 5 minutes, and then poured through a screen. The oil-containing absorption agent was collected on the screen, and allowed to drain for 5 minutes but not squeezed. The oil retained in the meshes of the screen was absorbed with ordinary paper toweling. Then, the oil-containing oil-absorbing agent retained on the screen is weighed, and the weight minus the conditioned dry weight of 5 g of the absorption agent is the amount of oil absorbed (oil weight). The ratio of oil weight to dry weight is referred to as absorption capacity, and for the agents tested is listed below in Table I. It is apparent that the greater the absorption capacity, the higher the value indicated in Table I.

TABLE I

| Absorption agent | Absorption capacity | |
|---|---|---|
| | Lubricating oil | Hydraulic oil |
| Granulated absorbing agent according to the invention | 1.8 | 2.0 |
| Shredded absorbing agent according to the invention | 5.0 | 3.6 |
| ABSOL | 1.0 | 0.9 |
| Sawdust | 3.4 | 3.4 |

The results in Table I clearly show the superior oil-absorbing capacity of the oil-absorbing composition of the invention, as compared to the conventional commercial product ABSOL. Compared to sawdust, the shredded product according to the invention is as good for hydraulic oil, and much better for lubricating oil, whereas the granulated product according to the invention has a somewhat lesser absorption capacity, both for hydraulic oil and lubricating oil. However, this somewhat lower oil-absorbing capacity is out balanced by the absence of dust, and the resulting absence of a dust explosion tendency, together with a low fire hazard. This is shown by the following experiments.

The tendency of the dust of several oil-absorbing agents was tested according to the two testing methods described in reprint No. H 4330033 from Teknisk Tidskrift 1970. The tests were carried out using a Hartman apparatus and using an ignition capsule.

Both the granulated and the shredded products according to the invention showed no tendency to explode when in the form of dust, using both tests, from which it is concluded that these products are safe, and not susceptible to dust explosion, under normal conditions.

The flammability of the products according to the invention was evaluated at the National Institute for Materials Testing in Sweden, using the following test procedure.

Ten gram samples were weighed into platinum dishes. The samples were then placed in an oven at 100° C. for ½ hour, removed, examined and weighed. The procedure was repeated in a muffle furnace at 200° C., 250° C., 300° C., 350° C., 400° C. and 500° C. The following results were obtained.

TABLE II

| Results | Examination | % loss of weight of weighed sample |
|---|---|---|
| After ½ hour at 110° C. | | |
| Granulated product according to the invention | No change | 1.8 |
| Shredded product according to the invention | No change | 3.1 |
| After ½ hour at 200° C. | | |
| Granulated product according to the invention | No change | 2.4 |
| Shredded product according to the invention | No change | 3.7 |
| After ½ hour at 250° C. | | |
| Granulated product according to the invention | Heavy smoke emission during heating. The sample was carbonized | 40.3 |
| Shredded product according to the invention | No change | 5.7 |
| After ½ hour at 300° C. | | |
| Granulated product according to the invention | The sample was carbonized | 49.4 |
| Shredded product according to the invention | Heavy smoke emission during heating. The sample was carbonized | 39.2 |
| After ½ hour at 350° C. | | |
| Granulated product according to the invention | The sample was carbonized | 50.8 |
| Shredded product according to the invention | Heavy smoke emission during heating. The sample was carbonized | 40.4 |
| After ½ hour at 400° C. | | |
| Granulated product according to the invention | The sample was carbonized | 57.2 |
| Shredded product according to the invention | Heavy smoke emission during heating. The sample was carbonized | 45.6 |
| After ½ hour at 500° C. | | |
| Granulated product according to the invention | Most of the carbon burnt. A grayish-black ash as residue | 60.9 |
| Shredded product according to the invention | Most of the carbon burnt. A grayish-black ash as residue | 49.4 |

The results in Table II show that under the test conditions, with free access of air, no real burning of the compositions of the invention is evidenced. Rather, a pyrolysis takes place. Neither flames nor glow are apparent from the samples. Thus, the products of the invention tested show a low fire hazard.

EXAMPLE 2

Virgin mechanical pulp (thermomechanical pulp, TMP) fibers sized with a conventional rosin size (Hercules T-size) were blended with kaolin in an amount of about 70% by weight of fibers and about 30% by weight of kaolin. Upon drying the following absorption capacity was obtained with respect to a conventional motor oil SAE 20 (absorption capacity measured in accordance with Example 1):

| | Absorption Capacity |
|---|---|
| Granulated absorbing agent according to the invention | 1.9 |
| Shredded absorbing agent according to the invention | 3.6 |

In addition, the material showed very low fire hazard.

EXAMPLE 3

Virgin chemical thermomechanical pulp (CTMP) fibers sized with a conventional rosin size (Hercules T-size) were blended with talcum in a weight ratio or 70:30. Upon drying the material showed very low fire hazard, and the following absorption capacity with respect to motor oil SAE 20:

| | Absorption Capacity |
|---|---|
| Granulated absorbing agent according to the invention | 1.9 |
| Shredded absorbing agent according to the invention | 3.8 |

EXAMPLE 4

Examples 3 was repeated, but using virgin chemical thermomechanical pulp (CTMP) fibers sized with a conventional neutral size (Hercules Aquapel). The absorbing agent obtained showed a very low fire hazard, and the same absorption capacity as the product of Example 3.

EXAMPLE 5

In this Example use was made of virgin chemical thermomechanical pulp (CTMP) fibers sized with Hercules T-size, 2% by weight, calculated on the weight of the virgin fibers, and a commercially available lacquer solution of an acrylate prepolymer from BASF (Einbrennlack FF 76-0016) containing 43% of active substance (hydroxyalkylmethacrylate as prepolymer and melamine resin as cross-linking agent), 30% xylene, 14% alcohol, and 13% glycol, to which was added 3% by weight (calculated on the lacquer solution) of acid curing agent from BASF (Säurehäter SC 10-9111). 70% by weight of the fibers were blended with 30% by weight of kaolin. Upon drying at 85° C. the absorbing agent showed a low fire hazard, and the following oil absorption capacity with respect to conventional motor oil:

|  | Absorption Capacity |
|---|---|
| Granulated absorbing agent according to the invention | 1.9 |
| Shredded absorbing agent according to the invention | 3.8 |

Owing to the increased hydrophobicity imparted to the absorbing agent by the acrylate, the absorbing agent showed clearly improved water-repellent properties, compared to the product of Example 3. These properties are of great value when taking up oil from a water surface.

EXAMPLE 6

70% by weight of chemical thermomechanical pulp (CTMP) fibers sized with neutral size (Hercules Aquapel) were blended with 30% by weight of calcium carbonate. Upon drying the absorbing agent showed a low fire hazard, and the following absorption capacity with respect to a motor oil SAE 20:

|  | Absorption Capacity |
|---|---|
| Granulated absorbing agent according to the invention | 2.0 |
| Shredded absorbing agent according to the invention | 3.9 |

EXAMPLE 7

Example 6 was repeated, but using gypsum instead of calcium carbonate as the inorganic filler. The absorbing agent showed a low fire hazard, and the following absorption capacity with respect to a motor oil SAE 20:

|  | Absorption Capacity |
|---|---|
| Granulated absorbing agent according to the invention | 1.7 |
| Shredded absorbing agent according to the invention | 3.3 |

EXAMPLE 8

Example 6 was repeated but using magnesium sulfate instead of calcium carbonate as the inorganic filler. The absorbing agent showed a low fire hazard, and the following absorption capacity with respect to motor oil SAE 20:

|  | Absorption Capacity |
|---|---|
| Granulated absorbing agent according to the invention | 1.6 |
| Shredded absorbing agent according to the invention | 3.3 |

Having regard to the foregoing disclosure, the following is claimed as the inventive and patentable embodiments thereof:

1. A particulate oil-absorbing composition which in dust form displays a low explosion hazard and a low flammability, but which after absorption of oil is flammable and entirely consumed when burned, the particles consisting essentially of as the major component at least 50% by weight hydrophobic cellulose pulp fibers in admixture with at least 30% up to 50% of an inorganic cellulose paper pulp filler.

2. A particulate oil-absorbing composition according to claim 1, in which the cellulose pulp fibers comprise reject fibers from a cellulose pulp selected from the group consisting of mechanical pulp, chemimechanical pulp, semichemical pulp, sulphate pulp and sulphite pulp and mixtures thereof.

3. A particulate oil-absorbing composition according to claim 1 in which the cellulose pulp fibers are sized.

4. A particulate oil-absorbing composition according to claim 3 in which the size is selected from the group consisting of rosin, starch and natural and synthetic resins.

5. A particulate oil-absorbing composition according to claim 1 in which the inorganic cellulose paper pulp filler is kaolin.

6. A particulate oil-absorbing composition according to claim 1 in which the inorganic cellulose paper filler is calcium carbonate.

7. A particulate oil-absorbing composition according to claim 1 in which the inorganic cellulose paper pulp filler is talc.

8. A particulate oil-absorbing composition according to claim 1 in which the cellulose pulp fibers comprise about 70% by weight of a mixture of mechanical fibers and sulphate fibers sized with rosin size, and about 30% by weight of kaolin.

9. A particulate oil-absorbing composition according to claim 1 in granulated form.

10. A particulate oil-absorbing composition according to claim 1 in shredded form.

* * * * *